(12) United States Patent
Latter et al.

(10) Patent No.: US 8,416,932 B2
(45) Date of Patent: *Apr. 9, 2013

(54) CONVENIENCE FEATURES IN A METHOD AND SYSTEM FOR PROVIDING ENHANCED CALLER IDENTIFICATION

(75) Inventors: Teresa Farias Latter, Kildeer, IL (US); John Wesley Moss, Lake Zurich, IL (US); Thomas Joseph McBlain, Arlington Heights, IL (US); James Thomas Maciejewski, Spring Grove, IL (US); Mary Louise Hardzinski, Palatine, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1323 days.

This patent is subject to a terminal disclaimer.

(21) Appl. No.: 11/869,534

(22) Filed: Oct. 9, 2007

(65) Prior Publication Data
US 2008/0031432 A1 Feb. 7, 2008

Related U.S. Application Data

(63) Continuation of application No. 10/442,364, filed on Apr. 14, 2003, now Pat. No. 7,302,049, which is a continuation of application No. 10/020,643, filed on Dec. 13, 2001, now Pat. No. 6,574,319, which is a continuation of application No. 09/264,611, filed on Mar. 9, 1999, now Pat. No. 6,332,021, which is a continuation-in-part of application No. 09/122,484, filed on Jul. 24, 1998, now abandoned.

(51) Int. Cl.
*H04M 1/56* (2006.01)
*H04M 1/64* (2006.01)
*H04M 7/00* (2006.01)

(52) U.S. Cl.
USPC .............. 379/142.01; 379/142.06; 379/142.1; 379/88.19; 379/221.11

(58) Field of Classification Search .......... 379/142.01–142.04, 142.06, 142.09, 379/142.1, 142.17, 142.18, 88.19, 88.2, 88.21, 379/93.23, 201.11, 207.02, 207.13, 207.15, 379/211.11, 221.08, 221.11, 229–230
See application file for complete search history.

(56) References Cited

U.S. PATENT DOCUMENTS

| | | | |
|---|---|---|---|
| 4,277,649 | A | 7/1981 | Sheinbein |
| 4,598,179 | A | 7/1986 | Clark et al. |
| 4,899,358 | A | 2/1990 | Blakley |
| 5,033,076 | A | 7/1991 | Jones et al. |
| 5,329,578 | A | 7/1994 | Brennan et al. |
| 5,341,414 | A | 8/1994 | Popke |

(Continued)

*Primary Examiner* — Quoc D Tran
(74) *Attorney, Agent, or Firm* — Cantor Colburn LLP

(57) ABSTRACT

A computer readable storage medium storing computer readable program code, the code configured to provide caller identification information to a called party when standard Caller ID cannot be provided. If standard caller ID information cannot be provided for a call, the call is interrupted by the present service and the calling party is prompted for audible caller identification information. In one embodiment, when the audible caller identification is provided, the call is presented to the called party with a distinctive ring at the called telephone station. In another embodiment, the calling party may enter a personal identification number (PIN) to bypass the requirement for audible caller identification information. In still another embodiment, when the PIN is entered, the call is presented with a distinctive ring at the called communication station. In still another embodiment, the called party may send the incoming call to a voice mail system.

12 Claims, 10 Drawing Sheets

U.S. PATENT DOCUMENTS

| | | | |
|---|---|---|---|
| 5,467,388 A * | 11/1995 | Redd et al. | 379/210.02 |
| 5,497,414 A | 3/1996 | Bartholomew | |
| 5,511,111 A | 4/1996 | Serbetcioglu et al. | |
| 5,521,969 A | 5/1996 | Paulus et al. | |
| 5,526,406 A | 6/1996 | Luneau | |
| 5,533,106 A | 7/1996 | Blumhardt | |
| 5,548,636 A | 8/1996 | Bannister et al. | |
| 5,555,100 A | 9/1996 | Bloomfield et al. | |
| 5,559,611 A | 9/1996 | Bloomfield et al. | |
| 5,559,859 A | 9/1996 | Dai et al. | |
| 5,572,583 A | 11/1996 | Wheeler, Jr. et al. | |
| 5,590,184 A | 12/1996 | London | |
| 5,594,784 A | 1/1997 | Velius | |
| 5,596,627 A | 1/1997 | Solomon et al. | |
| 5,604,792 A | 2/1997 | Solomon et al. | |
| 5,623,537 A | 4/1997 | Ensor et al. | |
| 5,651,053 A | 7/1997 | Mitchell | |
| 5,668,862 A | 9/1997 | Bannister et al. | |
| 5,729,593 A | 3/1998 | Baker et al. | |
| 5,734,706 A | 3/1998 | Windsor et al. | |
| 5,796,806 A | 8/1998 | Birckbichler | |
| 5,802,148 A | 9/1998 | Sizer, II | |
| 5,848,142 A | 12/1998 | Yaker | |
| 5,850,435 A | 12/1998 | Devillier | |
| 5,883,942 A | 3/1999 | Lim et al. | |
| 5,905,774 A | 5/1999 | Tatchell et al. | |
| 6,122,357 A | 9/2000 | Farris et al. | |
| 6,160,876 A | 12/2000 | Moss et al. | |
| 6,178,232 B1 | 1/2001 | Latter et al. | |
| 6,208,727 B1 | 3/2001 | Ganpaul et al. | |
| 6,252,953 B1 | 6/2001 | Gruchala et al. | |
| 6,332,021 B2 | 12/2001 | Latter et al. | |
| 6,400,809 B1 | 6/2002 | Bossemeyer et al. | |
| 6,574,319 B2 | 6/2003 | Latter et al. | |
| 7,302,049 B2 * | 11/2007 | Latter et al. | 379/142.01 |

* cited by examiner

CONVENIENCE FEATURES IN A METHOD AND SYSTEM FOR PROVIDING ENHANCED CALLER IDENTIFICATION

CROSS REFERENCE TO RELATED APPLICATIONS

This application is a continuation of U.S. patent application Ser. No. 10/442,364, filed Apr. 14, 2003, now U.S. Pat. No. 7,302,049, which is a continuation of U.S. patent application Ser. No. 10/020,643, filed Dec. 13, 2001, now U.S. Pat. No. 6,574,319, which is a continuation of U.S. patent application Ser. No. 09/264,611, filed Mar. 9, 1999, now U.S. Pat. No. 6,332,021, which is a continuation-in-part of U.S. patent application Ser. No. 09/122,484, filed Jul. 24, 1998, abandoned.

BACKGROUND

The present invention relates generally to telecommunications services and more particularly to caller identification.

Telecommunications service providers typically offer services that attempt to provide customers with information that enables them to determine whether or not to accept a call before answering the call. One service that provides such information is caller identification ("Caller ID"). Standard Caller ID services generally provide a customer with an indication of who is calling without requiring the customer to answer the call. These systems typically retrieve information about the calling party from a database and provide that information to the called party. Customer premise equipment (CPE) in the form of a display device is generally used to provide the called party with a visual readout of the name and/or telephone number associated with the calling party.

However, the effectiveness of Caller ID systems can be reduced due to a number of different occurrences. One such occurrence is the inability of a service provider to provide the standard Caller ID information for a particular incoming call. A service provider may not be able to provide the standard Caller ID information if the Caller ID information is blocked by the calling party, or if the Caller ID information is unavailable or incomplete. When the standard Caller ID information cannot be provided, the called party is not adequately informed about who is calling and cannot determine whether or not to accept the incoming call before answering the call.

Patent application Ser. No. 09/122,484, filed Jul. 24, 1998 and commonly assigned to the assignee of the present application, is incorporated herein by reference. This patent application discloses a method and system for providing a called party with audible caller identification information when standard caller identification cannot be provided. When standard caller identification cannot be provided, the call is blocked and a request for audible caller identification is transmitted to the calling party. The audible information is subsequently transmitted to the called party who decides to reject or accept the call after answering the call.

However, there is a desire to enhance this service for the convenience of both the calling party and the called party. In some instances, it may be desirable for the calling party to bypass the above-described system to have the call completed immediately, such as in a family emergency. In other instances, it may be desirable to give an indication of the nature of the call to the called party before the call is answered. In still other instances, it is desirable to provide an option other than accepting and rejecting the call.

DETAILED DESCRIPTION OF THE DRAWINGS AND THE PRESENTLY PREFERRED EMBODIMENTS

By way of introduction, the preferred embodiments described below include a method and system for providing a called party with audible caller identification information when standard caller identification information cannot be provided. Calls for which standard caller identification information is blocked, unavailable or incomplete are prevented from being connected to the called party. Instead of connecting the calls, a request for audible caller identification information is transmitted to the calling party. If the calling party provides the requested audible caller identification information, the audible information is transmitted to the called party. In one embodiment, the calling party may enter a personal identification number to bypass or override the system and have the call connected immediately. In another embodiment, a distinctive ring is provided so that the called party is aware that standard Caller ID information could not be provided for the call. In yet another embodiment, a distinctive ring is provided to indicate that the calling party entered a personal identification number to bypass the system. And in still a further embodiment, the called party may route the call to voice mail.

Figure 1:
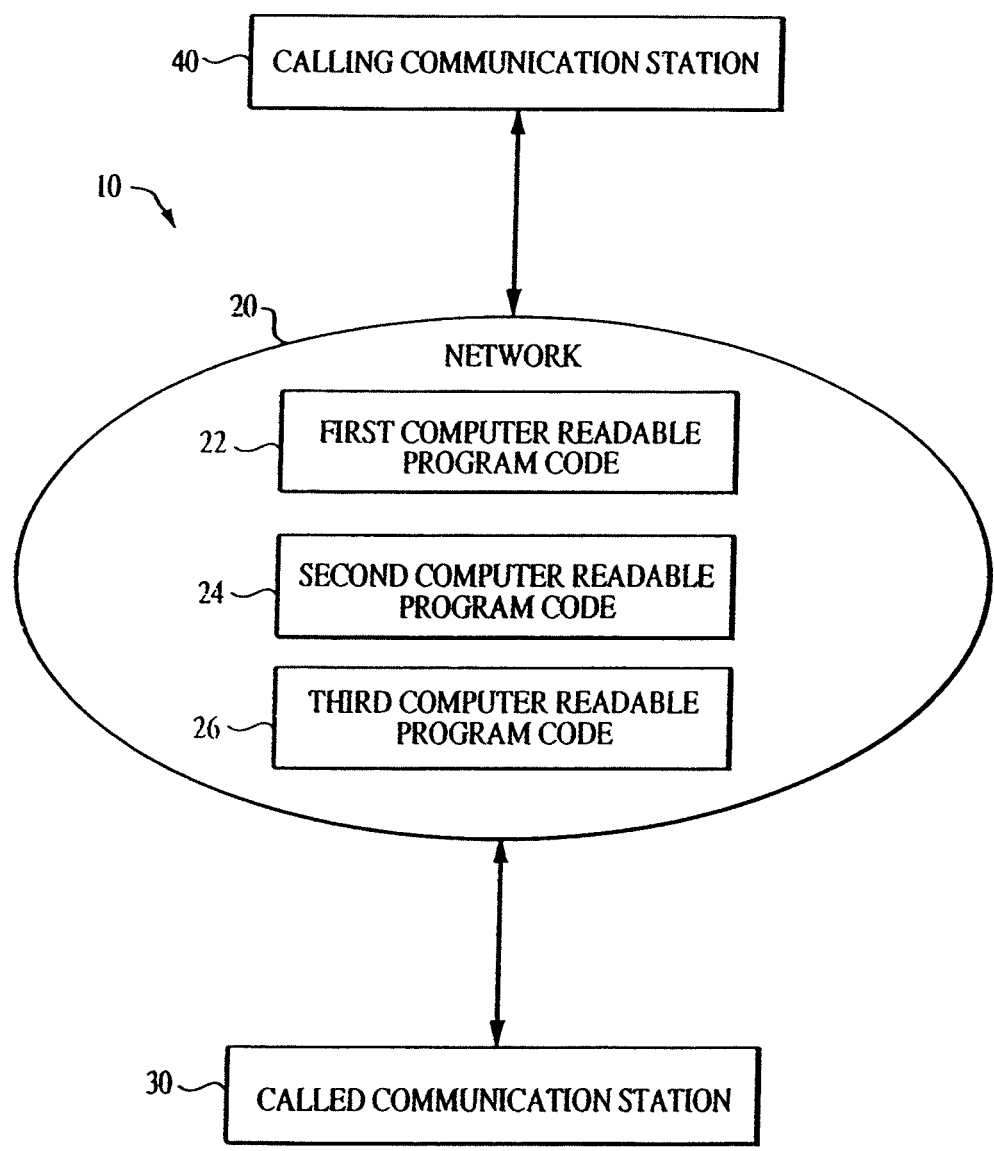
FIG. 1 is a block diagram of a telecommunications system.

By way of example, FIG. 1 depicts a system 10 of a preferred embodiment. The system 10 comprises a network 20, a called communication station 30 coupled with the network 20 and a calling communication station 40 coupled with the network 20. The term "coupled with," as used herein, means directly coupled with or indirectly coupled with through one or more components. The network 20 preferably comprises computer usable medium having first, second and third computer readable program codes 22, 24, 26 embodied therein. It is important to note that while the program codes 22, 24, 26 have been shown as three separate elements, their functionality can be combined and/or distributed. It is also important to note that "medium" is intended to broadly include any suitable medium including analog or digital, hardware or software, now in use or developed in the future.

The system 10 is preferably implemented in a telecommunications network as known to those skilled in the art. Alternatively, the system 10 can be implemented in a computer network or any other network that is adapted to transmit, store and retrieve information. The calling communication station 40 and the called communication station 30 preferably comprise analog telephone stations as known to those skilled in the art. According to an alternative embodiment, the communication stations 30, 40 can comprise any suitable communication station adapted for use in the present embodiments as known to those skilled in the art.

Figure 2:
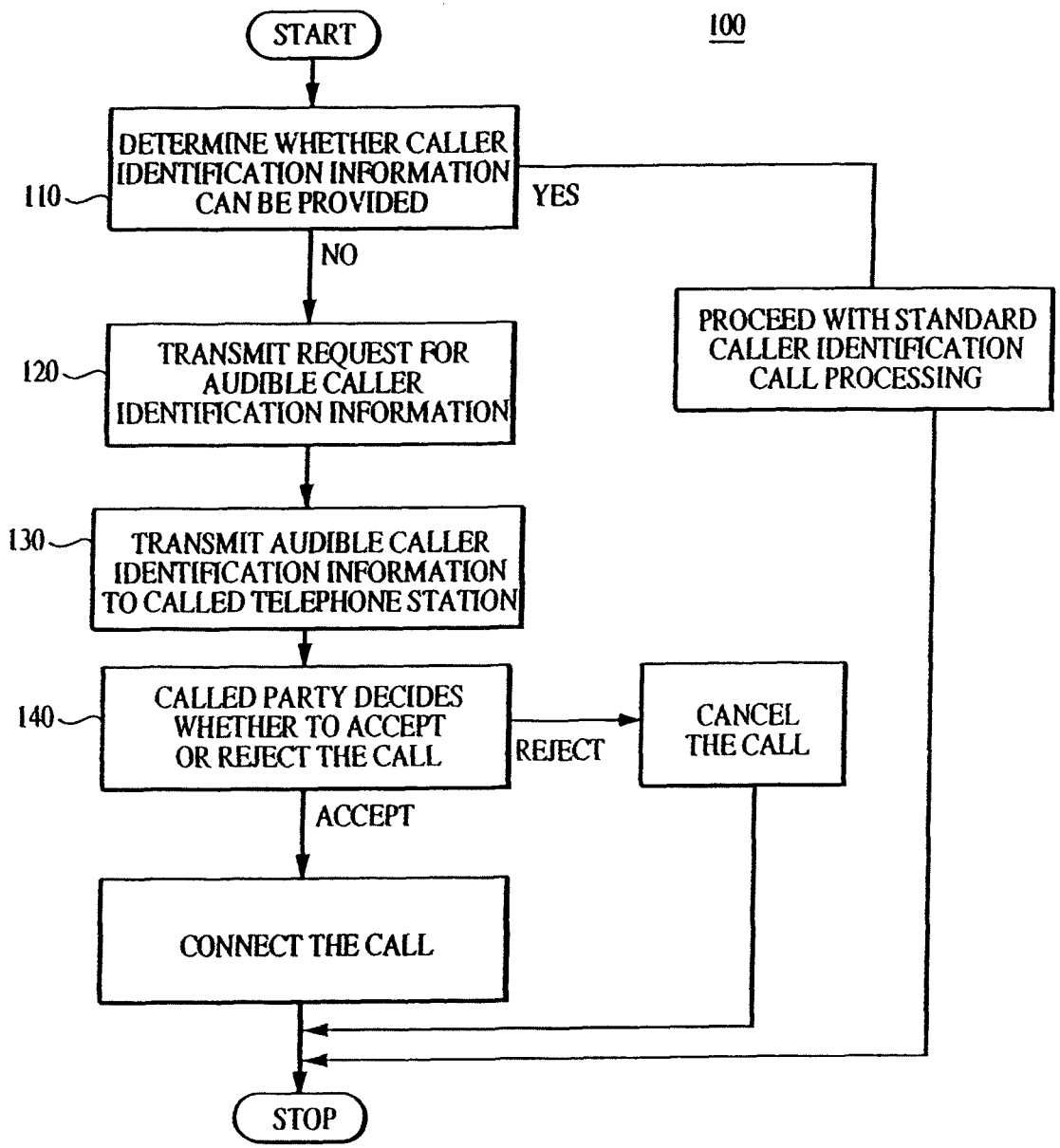
FIG. 2 is a flow chart of a method for providing enhanced caller identification.

The system 10 of FIG. 1 can be used to implement the method 100 depicted in FIG. 2. When the calling party at the calling communication station 40 places a call to a called party at the called communication station 30, the first computer readable program code 22 determines whether standard caller identification information associated with the calling communication station 40 can be provided to the called communication station 30 (step 110, FIG. 2). As used herein, the term standard caller identification (Caller ID) information means the information associated with a calling communication station that is typically stored in a database and automatically retrieved and provided to a called party as known to those skilled in the art. If it is determined that standard caller identification information cannot be provided, the second computer readable program code 24 transmits a request for audible caller identification information to the calling communication station 40 (step 120). As used herein, the term audible caller identification information means audible information provided by the calling party in response to a request for such information. If the calling party provides the requested audible caller identification information, the third computer readable program code 26 transmits the audible caller identification information to the called communication station 30 (step 130). After receiving the audible caller identification information, the called party can decide whether to proceed with the call or cancel the call (step 140).

Figure 3:
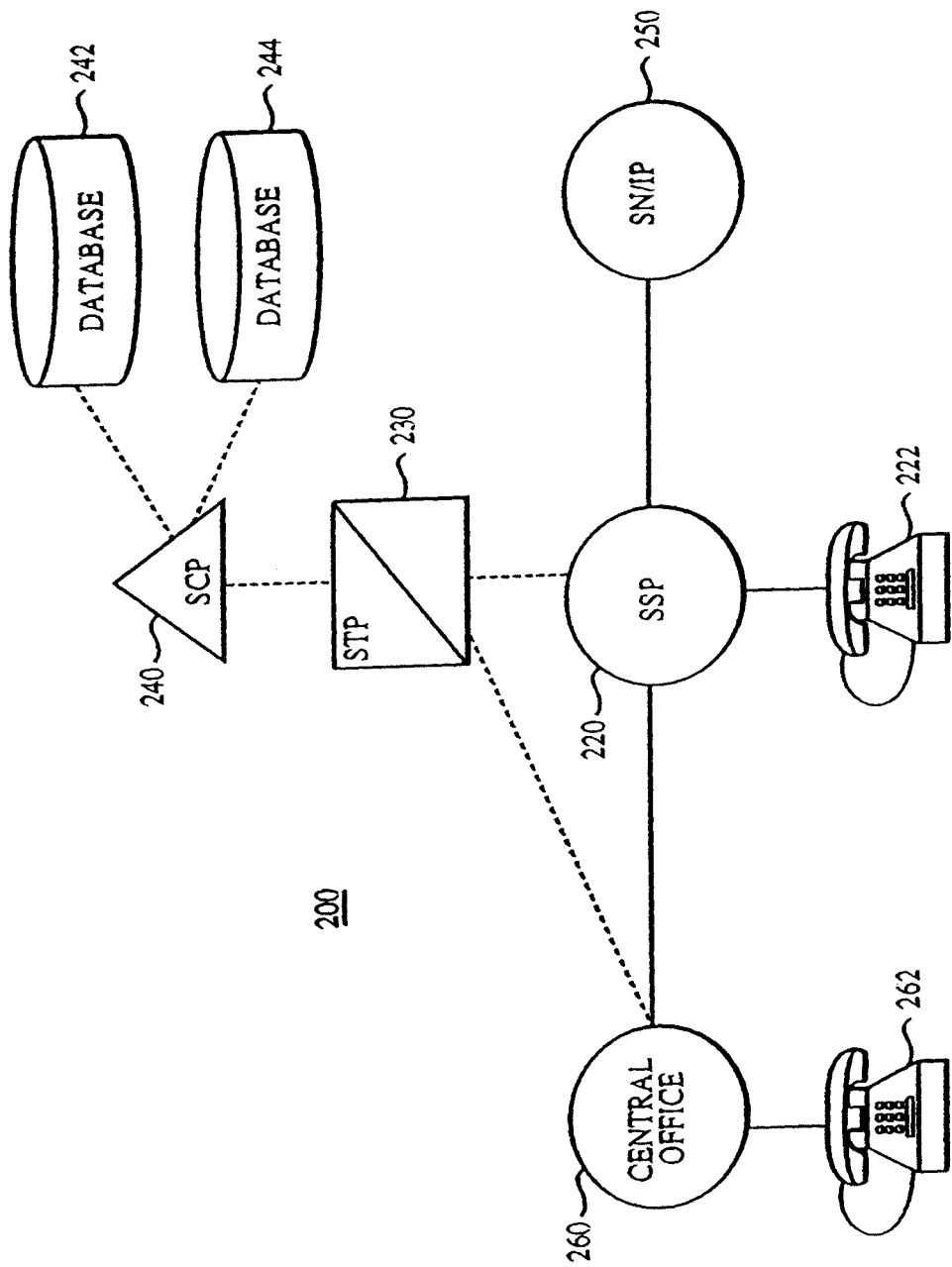
FIG. 3 is a block diagram of the telecommunications system of FIG. 1.

By way of further example, FIG. 3 depicts a preferred embodiment of the system 10 described above. In FIG. 3, the system 200 comprises a service switching point (SSP) 220, a signal transfer point (STP) 230, a service control point (SCP) 240, a first SCP database 242, a second SCP database 244, a service node or intelligent peripheral (SN/IP) 250, a central office 260, called telephone station 222 and calling telephone station 262. In the preferred embodiment, the SSP 220, the STP 230 and the SCP 240 are intelligent network system components. Intelligent network system components, also referred to as advanced intelligent network (AIN) components, suitable for implementing the present embodiment are commercially available from several vendors and are known to those skilled in the art. AIN components can implement computer readable program code as known to those skilled in the art. Vendors of AIN components typically have a preferred programming language and operating platform as known to those skilled in the art.

SSP 220 preferably comprises an AIN switch that routes calls, recognizes and responds to triggers, generates queries to obtain call information and responds to returned call information. SSP 220 connects called telephone station 222 with central office 260 to enable a calls to be placed between called telephone station 222 and calling telephone station 262. SSP 220 preferably communicates with SCP 240, central office 260 and SN/IP 250 by utilizing a signaling protocol such as Signaling System 7 (SS7) or other such signaling protocols as presently known to those skilled in the art or developed in the future. SSP 220 preferably generates queries to SCP 240 and receives and responds to responses to the queries returned from SCP 240.

STP 230 preferably comprises a network element that transfers signaling communications in response to signaling protocols such as SS7 or other such signaling protocols as presently known to those skilled in the art or developed in the future. STP 230 preferably transfers queries from SSP 220 to SCP 240 and transfers responses to the queries from SCP 240 to SSP 220.

SCP 240 preferably comprises an AIN element that stores call information and receives and responds to queries. SCP 240 preferably stores call control information in the first SCP database 242 and can access the stored call control information. SCP 240 also stores standard caller identification information in the second SCP database 244 and can access the stored caller identification information. SCP 240 receives queries generated by SSP 220 and preferably responds to the queries by performing database searches to locate the requested call control information or caller identification information as known to those skilled in the art. SCP 240 can forward the call control information or caller identification information to SSP 220.

SN/IP 250 preferably comprises a network element that enables communications between telephone stations 222, 262 and the network. The SN/IP 250 may be a service node, an intelligent peripheral, a compact service node, or any equipment functionally equivalent to these AIN components. In the illustrated embodiment, the SN/IP 250 is a compact service node (CSN).

SN/IP 250 can preferably transmit messages to and receive responses from telephone stations 222, 262. SN/IP 250 can generate announcements that can be transmitted to telephone stations 222, 262. SN/IP 250 can transmit responses such as audible caller identification information from telephone station 262 to telephone station 222 by connecting telephone stations 222, 262 or by recording and playing back the responses as known to those skilled in the art. The announcements transmitted to telephone station 222 preferably comprise accept and reject options along with requests for input from the telephone station 222. The requests for input preferably comprise requests for input that can be used by SN/IP 250 to cancel calls to telephone station 222, connect calls to telephone station 222, forward calls to a voice mail system or another location such as another telephone line, and transmit messages to telephone station 262. As used herein, the term voice mail system means all types of message recording systems as known to those skilled in the art. SN/IP 250 can preferably receive and respond to the input transmitted from telephone station 222. The term input means any suitable signal such as DTMF tones, voice input, dial pulse input or modem/fax input as known to those skilled in the art.

Database 242 preferably comprises a data storage element for use with SCP 240 as known to those skilled in the art. Database 242 preferably stores call control information that can be implemented by SSP 220 to control calls. Such call control information is known to those skilled in the art.

Database 244 preferably comprises a standard caller identification with name database as known to those skilled in the art. Database 244 preferably includes the name of the person associated with calling telephone station 262 along with the telephone number that is associated with calling telephone station 262. Database 244 can alternatively comprise a caller assistance database as known to those skilled in the art. While databases 242, 244 are depicted within a telecommunications system, databases 242, 244 can comprise any suitable databases containing information adapted for use in the present embodiment and are not limited to databases located within a telecommunications network. It is also important to note that while databases 242, 244 are shown as separate components, they can be implemented as a single database.

Central office 260 preferably comprises an AIN network switch as known to those skilled in the art. Central office 260 enables calls to be placed between calling telephone station 262 and called telephone station 222. Alternatively, central office 260 can comprise a non-AIN network switch as known to those skilled in the art.

Telephone stations 222, 262 preferably comprise telephone sets as known to those skilled in the art, which may be analog or digital telephone sets. Alternatively, telephone stations 222, 262 can comprise wireless, PCS, ISDN or any other form of communication station known to those skilled in the art. Called telephone station 222 preferably includes CPE equipment for use with caller identification services as known to those skilled in the art.

Figure 4:
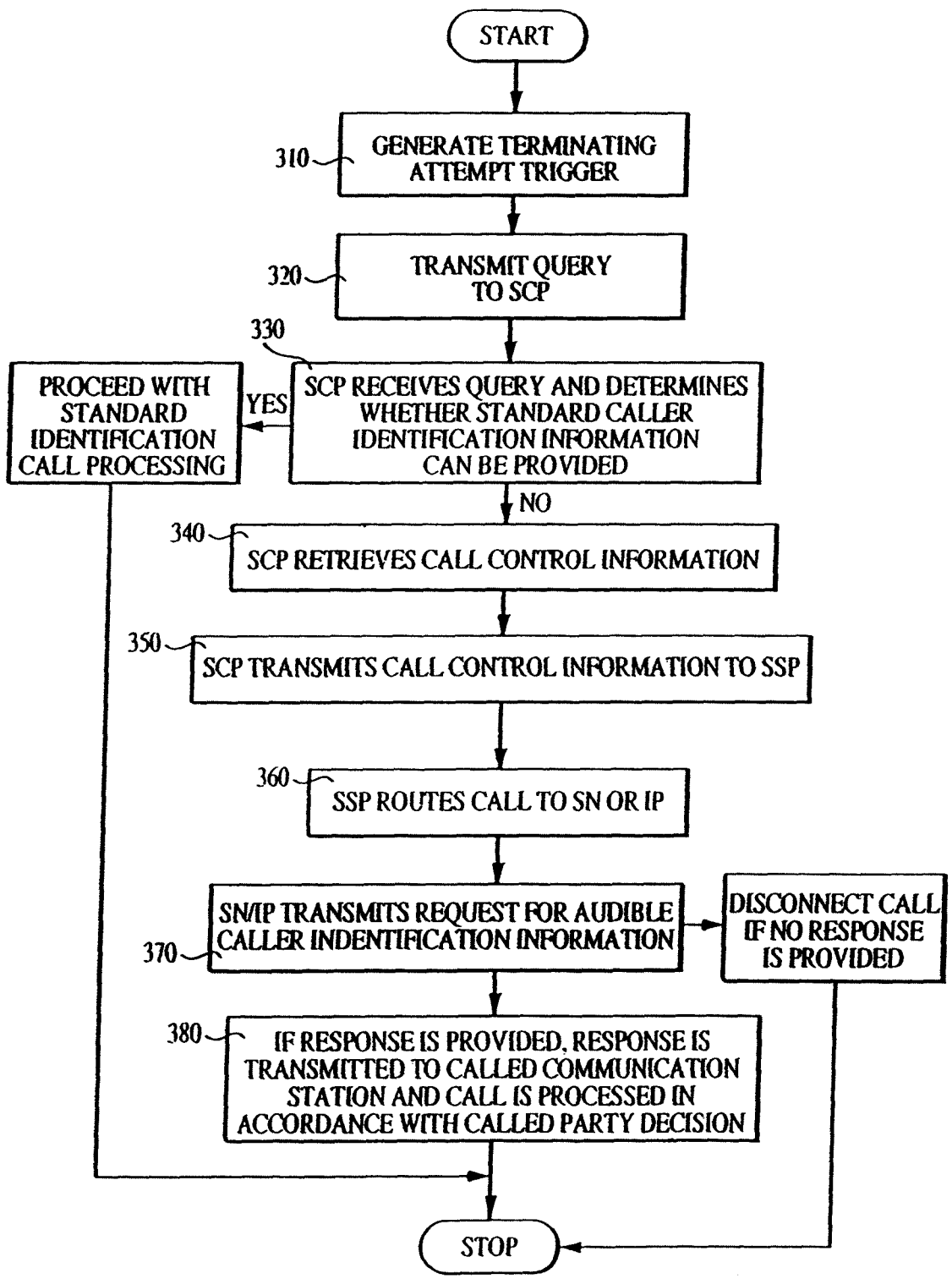
FIG. 4 is a flow chart of a method for providing enhanced caller identification using the system of FIG. 3.

The system depicted in FIG. 3 can be utilized to implement the method 300 depicted in FIG. 4. For purposes of illustration, assume that a calling party at calling telephone station 262 places a call to a called party at called telephone station 222. In an attempt to connect the call, central office 260 routes the call to SSP 220.

In this embodiment, when the call is routed to SSP 220, a terminating attempt trigger is activated (step 310) when SSP 220 attempts to connect the call to called telephone station 222. The trigger generates a query referred to as a termination attempt query that is sent to SCP 240 (step 320). The query preferably includes a calling party identification parameter which can include a calling party presentation restriction indicator as known to those skilled in the art and requests the return of standard Caller ID information. The telephone number associated with the calling telephone station 262 is preferably included in the calling party identification parameter of the query as known to those skilled in the art. SCP 240 receives the query and determines whether or not the called party at called telephone station 222 subscribes to the present service. In response to a determination that the called party subscribes to the present service, SCP 240 analyzes the information included with the query to determine whether standard Caller ID information can be provided to called telephone station 222 (step 330).

If the standard Caller ID information cannot be provided, SCP 240 accesses database 242 to retrieve call control information (step 340) and returns the call control information to SSP 220 (step 350). The SCP 240 transmits the call control information to the SSP 220 in a forward call message. The call control information sent to SSP 220 will contain a lead directory number that uniquely identifies the basic rate interface (BRI) or primary rate interface (PRI) associated with the SN/IP 250. In response to the call control information, SSP 220 routes the call to SN/IP 250 (step 360). When SN/IP 250 receives the call, SN/IP 250 generates a request for audible caller identification information that is transmitted to the calling telephone station 262 (step 370). The request preferably comprises a statement indicating that the called party doesn't accept calls from unidentified callers and a request for the calling party to speak his/her name and/or the name of the company that they represent. The request preferably comprises an audible message. If the calling party provides an audible response, SN/IP 250 enables the audible response to be transmitted to called telephone station 222 (step 380). Alternatively, if the calling party does not provide the requested information, the call is canceled (step 390).

Figure 5:
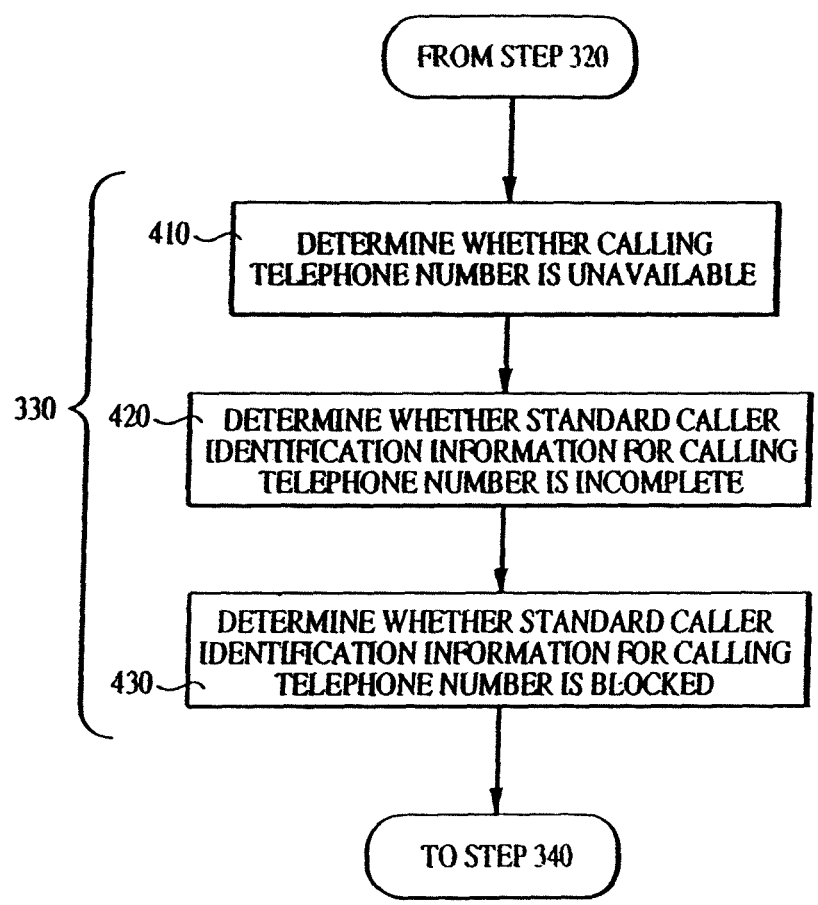
FIG. 5 is a more detailed flow chart of a portion the method of FIG. 4.

The step of determining whether standard Caller ID information can be provided (step 330, FIG. 4) preferably comprises the steps shown in FIG. 5. The SCP 240 preferably first determines whether standard Caller ID information is unavailable (step 410). The SCP 240 preferably determines whether the standard Caller ID information is unavailable by determining whether or not the calling party identification parameter is present in the query as known to those skilled in the art. In addition, the SCP 240 preferably determines whether the standard Caller ID information is incomplete (step 420). The SCP 240 preferably determines whether the standard Caller ID information is incomplete by determining whether or not the calling party identification parameter is a valid telephone number as known to those skilled in the art. In addition, the SCP 240 preferably determines whether the standard Caller ID information has been blocked (step 430). The SCP 240 preferably determines whether the standard Caller ID information has been blocked by determining whether or not the calling party identification presentation restriction indicator is set to "presentation restricted" as known to those skilled in the art.

Figure 6:
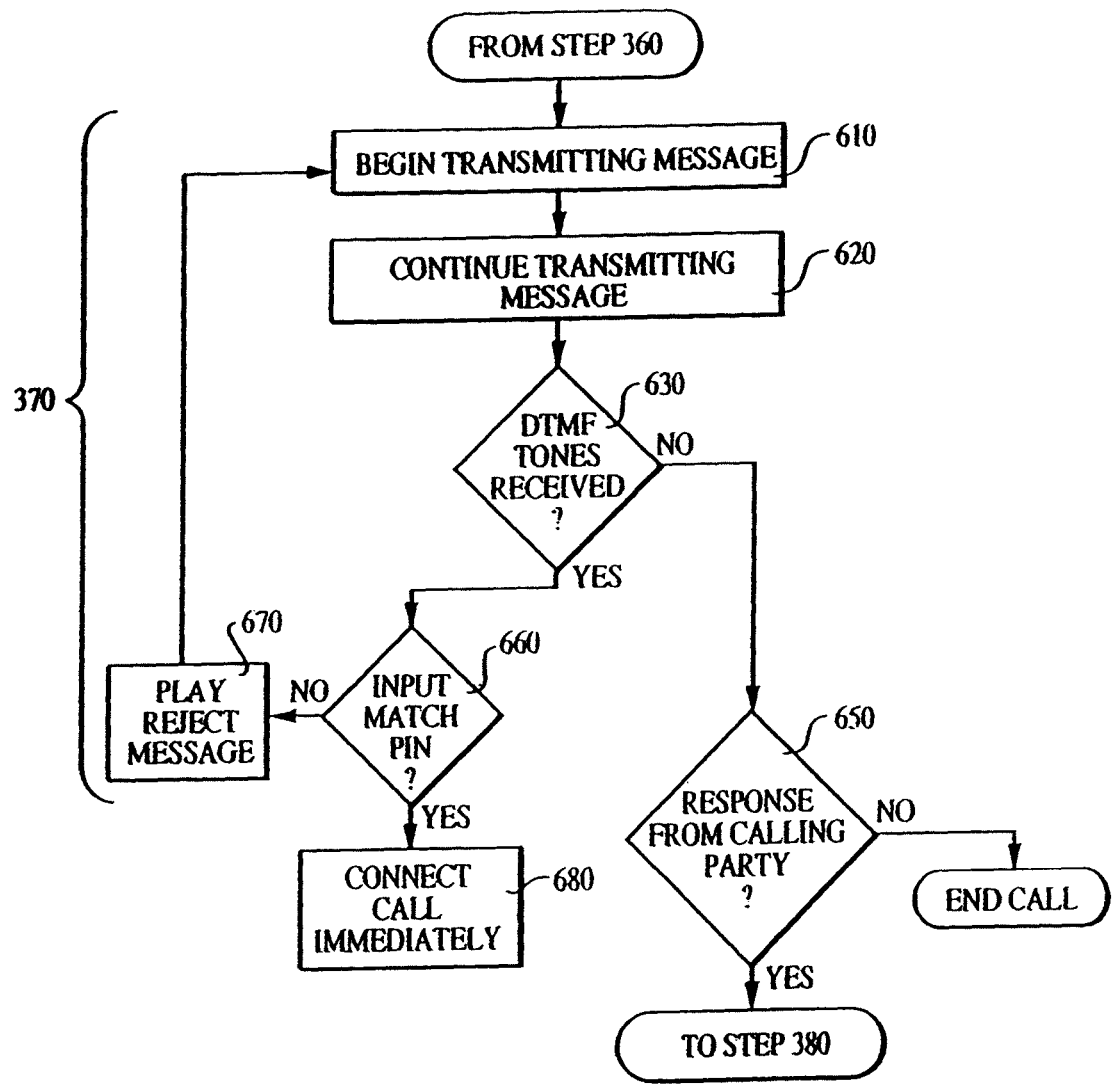
FIG. 6 is a more detailed flow chart of a portion the method of FIG. 4.

The step of transmitting a request for audible caller identification information by the SN/IP (step 370, FIG. 4) in one embodiment comprises the steps shown in FIG. 6. The steps illustrated in FIG. 6 permit a calling party to enter a personal identification number (PIN) to bypass or override the prompt for audible caller identification information and waiting for the called party to accept the call. The PIN may be given out by the called party to friends or family for use in emergencies or at other suitable times. If the correct PIN is entered, the call is connected to the called telephone station 222 immediately without any further intervention.

At step 610, the SN/IP 250 begins transmitting the request message to the calling party. As noted above, the message includes a statement indicating that the called party does not accept calls from unidentified callers and a request for the calling party to speak his or her name. At step 620, the SN/IP 250 continues transmitting the message.

Meanwhile, at step 630, the SN/IP 250 determines if the calling party has begun entering data such as a PIN. This determination can be made in any suitable manner. In the illustrated embodiment, the SN/IP 250 detects dual tone multiple frequency (DTMF) signals entered by the calling party at the calling telephone station 262. At step 650, after the message has been played, the SN/IP 250 determines if the calling party has provided a response, for example, by speaking a name. If not, the call is cancelled. If so, control proceeds to step 380 (FIG. 4).

If, at step 630, DTMF tones have been received, at step 660 it is determined if the PIN entered by the calling party matches a preset identification number. The SN/IP 250 converts the DTMF signals to numerical data or digital data representative of the numbers entered by the calling party. The preset identification number may be stored at the SN/IP 250 or at any suitable location in the system 200. If the PIN matches the stored value, at step 680 the call is connected immediately. The SN/IP 250 connects the calling telephone station 262 and the called telephone station 222 and the called telephone station 222 begins ringing. If the PIN does not match the stored value, at step 670 a reject message is played to indicate to the calling party that an incorrect PIN was entered. Control then proceeds to step 610 to prompt the calling party to speak his/her name.

Figure 7:
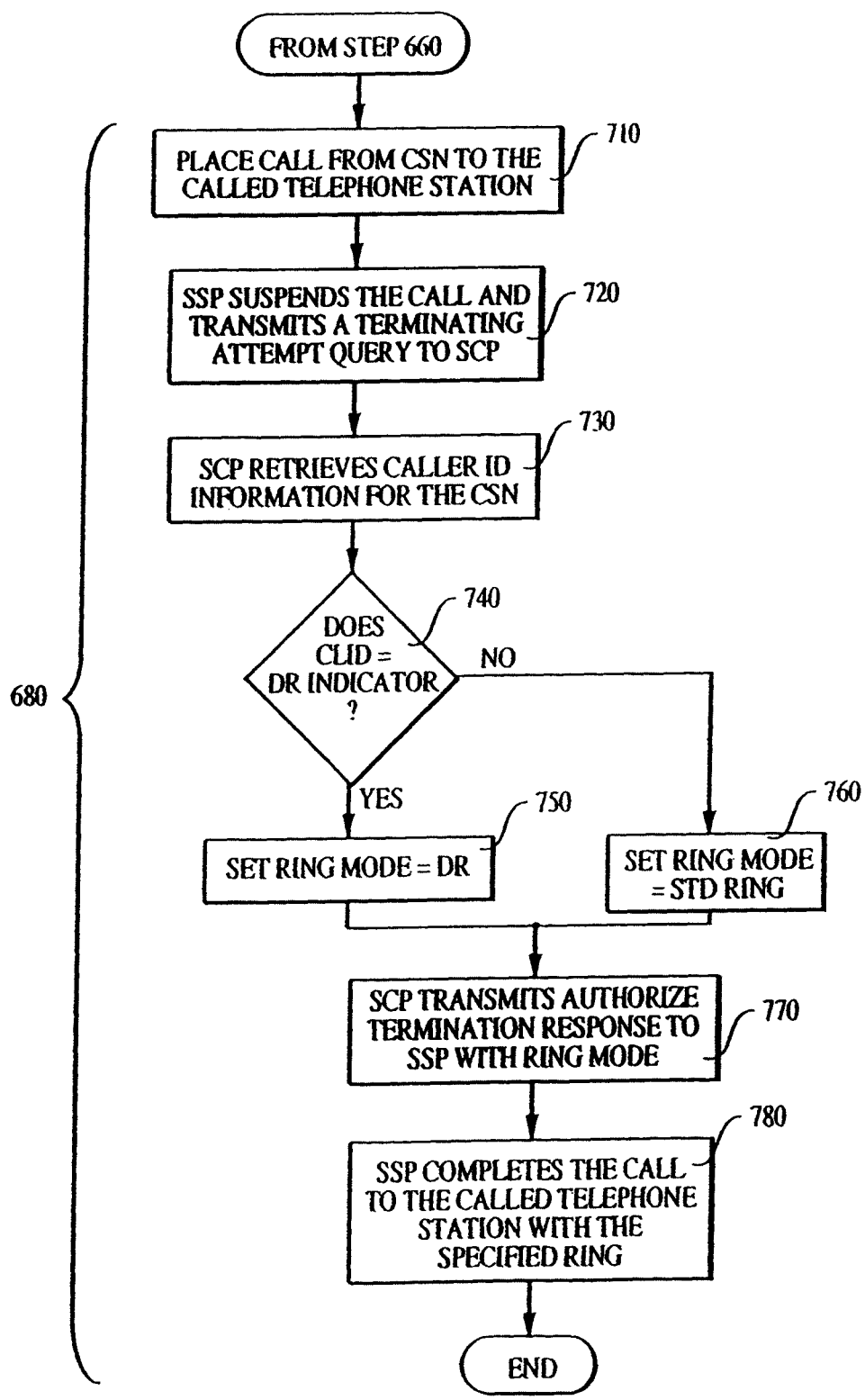
FIG. 7 is a more detailed flow chart of a portion the method of FIG. 6.

The step of connecting the call between the calling telephone station 262 and the called communication station 222 (step 680, FIG. 6) in one embodiment comprises the steps shown in FIG. 7. In this embodiment, when the calling party has entered a PIN to override the service of the illustrated system, the call is immediately connected and the phone is rung with a distinctive ring or ringing cadence to indicate to the called party that the incoming call bypassed the present service.

At step 710, the SN/IP 250, embodied as a CSN in FIG. 7, places a call to the called telephone station 222 to complete the call in response to the PIN override. At step 720, the SSP 220 detects a terminating attempt trigger and suspends the call. The SSP 220 transmits a terminating attempt query message to the SCP 240. The terminating attempt query message includes the DN for the SN/IP 250 and an indicator.

The terminating attempt query message includes control information, such as calling line identification (CLID) information for the SN/IP 250. In the illustrated example, the call control information includes a unique directory number (DN) for the SN/IP 250 and an indicator which indicates that, under the present circumstance, the call should be completed with a distinctive ring. The indicator may even specify the particular distinctive ring to use. In the present embodiment, the indicator is provided by predetermined caller identification information included in the call control information. For example, the CLID information may be set to a predetermined number or text string, such as "distinctive ring." In other embodiments, the indicator, which indicates that the call should be completed with a distinctive ring, may comprise a service indicator as known to those skilled in the art.

At step 730, the SCP 240 processes the terminating attempt query message. The SCP 240 retrieves the DN for the SN/IP 250 and the indicator from the message and compares the indicator with stored values, step 740. If the indicator matches a stored value, which may be termed a distinctive ring indicator, at step 750 the SCP 240 sets a ring mode for the call to distinctive ring (DR). If the indicator does not match the distinctive ring indicator, the SCP 240 sets the ring mode for the call to standard (STD) ring at step 760.

At step 770, the SCP transmits an authorize termination response message to the SSP 220. The authorize termination response message includes an indicator of the ring mode. At step 780 the SSP 220 completes the call to the called telephone station 222 with the specified ring. If the ring mode is set to distinctive ring, a distinctive ring is provided.

Figure 8:
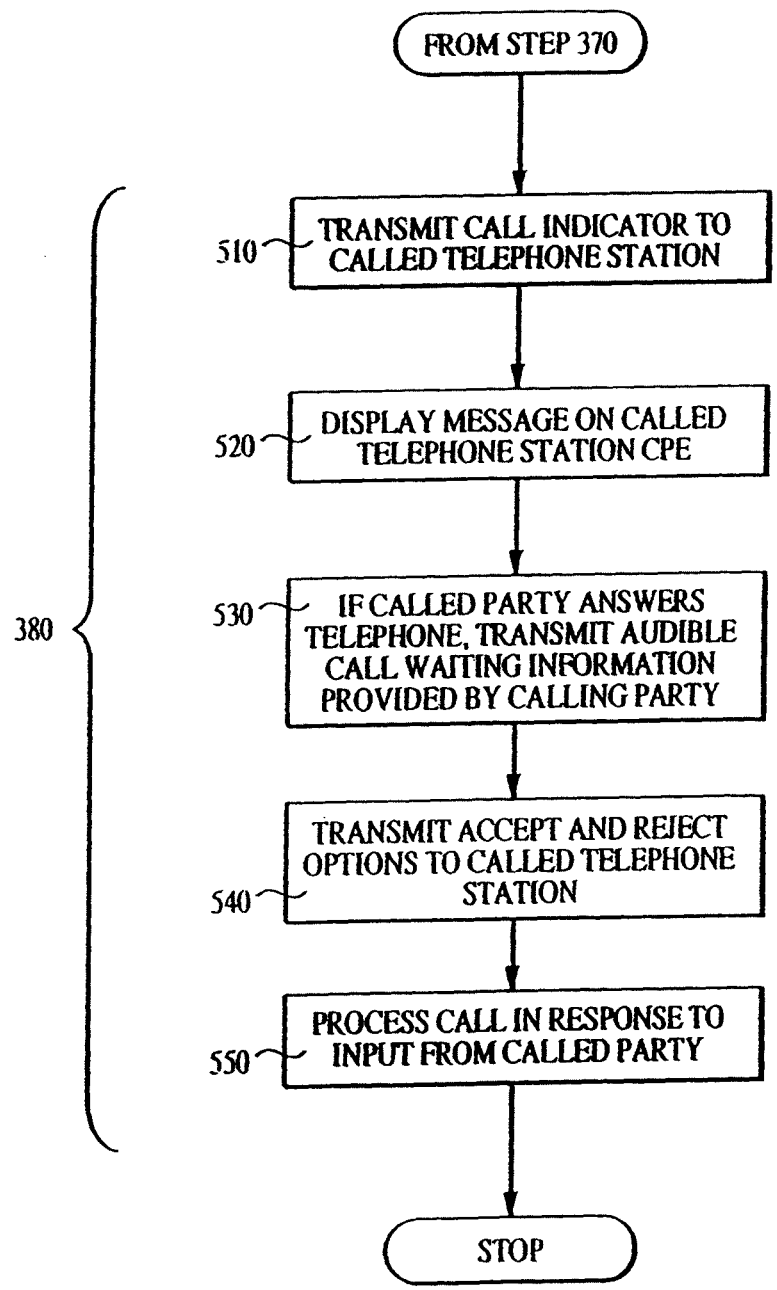
FIG. 8 is a more detailed flow chart of a portion the method of FIG. 4.

The step of providing the audible caller identification information to the called party (step 380, FIG. 4) in one embodiment comprises the steps shown in FIG. 8. Preferably, called telephone station 222 rings (step 510) to signify that a call has been placed to called telephone station 222. While called telephone station 222 is ringing, a text message can be transmitted to called telephone station 222 and the text message can be displayed on the CPE equipment at called telephone station 222 (step 520) as known to those skilled in the art. The text message preferably indicates that the call is being handled by the present service and identifies the name of the present service. If the called party answers the telephone (i.e. the telephone is off hook), the audible caller identification information that was provided by the calling party is transmitted to called telephone station 222 (step 530). The audible caller identification information is preferably recorded and played back to the called telephone station 222 as known to those skilled in the art. Alternatively, the calling telephone station 262 and the called telephone station 222 can be connected such that the audible caller identification information can be transmitted between the telephone stations 262, 222.

After the audible caller identification information has been transmitted, a message is transmitted to called telephone station 222 (step 540). The message preferably includes instructions that allow the called party to accept or reject the call by providing the appropriate input. The message preferably comprises audible instructions that are transmitted by SN/IP 250 to called telephone station 222. The accept and reject options preferably comprise, accepting the call by enabling the connection of the call to the called telephone station 222, canceling the call by disabling the connection of the call to the called telephone station 222, forwarding the call to a voice mail system or another location and sending a message to calling party. The message sent to the calling party can comprise a request that the called party be taken off a telemarketer's call list. Each of these options is preferably invoked when the called party provides the appropriate input.

In response to input provided by the called party, the SN/IP 250 can process the call (step 550). Accordingly, the SN/IP 250 can connect the call, cancel the call, transmit a message to the calling telephone station 262 or forward the call to a voice mail system or another location in response to the input provided by the calling party.

In a further alternative embodiment, the present systems and methods can be configured to work in conjunction with answering machines and voice mail systems. After the called party answers the telephone (step 530, FIG. 8) a message can be transmitted to the called telephone station 222 requesting the called party to provide appropriate input to signify that the call is being answered by a human. The message preferably comprises an audible message and is preferably transmitted to the called telephone station 222 by the SN/IP 250. The input can comprise any suitable signal such as DTMF tones, dial pulse input, modem/fax input or voice input as known to those skilled in the art. If the called party provides the requisite input, the audible caller identification information provided by the calling party can be transmitted to the called party. However, if input is not provided within a predetermined amount of time, the audible caller identification information is not transmitted to the called party. Instead, a message is played to the calling party to advise that the call is being handled by a voice messaging system. The call from the calling party is joined with the call to the answering machine or the voice mail system and the calling party can leave a conventional message. The preferred time period within which the input must be received to prevent the calling party from being connected with the answering machine or voice mail system is three to five seconds.

Alternatively, if an answering machine or voice mail system answers the call, the answering machine or voice mail system can immediately transmit a tone input to SN/IP 250 to signify that the call is not being answered by a human. In response to the tone input, the SN/IP 250 can connect the calling party to the answering machine or voice mail system and the calling party can leave a conventional message.

In order to connect the calling party with the answering machine or voice mail system as described herein, the SN/IP 250 performs a join function between the call from the calling communication station and the call to the voice mail system or answering machine. In an AIN network, the SN/IP 250 performs a 2 B transfer as known to those ordinarily skilled in the art.

In a further alternative embodiment, the present system and method can be configured to work in conjunction with standard caller identification services. After the trigger is sent from the SSP 220 (step 320, FIG. 4), the SCP 240 can determine whether the called party at the called telephone station 222 has subscribed to the present service. If the called party has not subscribed to the present service, the call can be handled in accordance with standard Caller ID procedures as known to those skilled in the art. In addition, if the SCP 240 determines that the standard caller identification information can be provided (step 330, FIG. 4), the call can be handled in accordance with standard Caller ID procedures as known to those skilled in the art.

Figure 9:
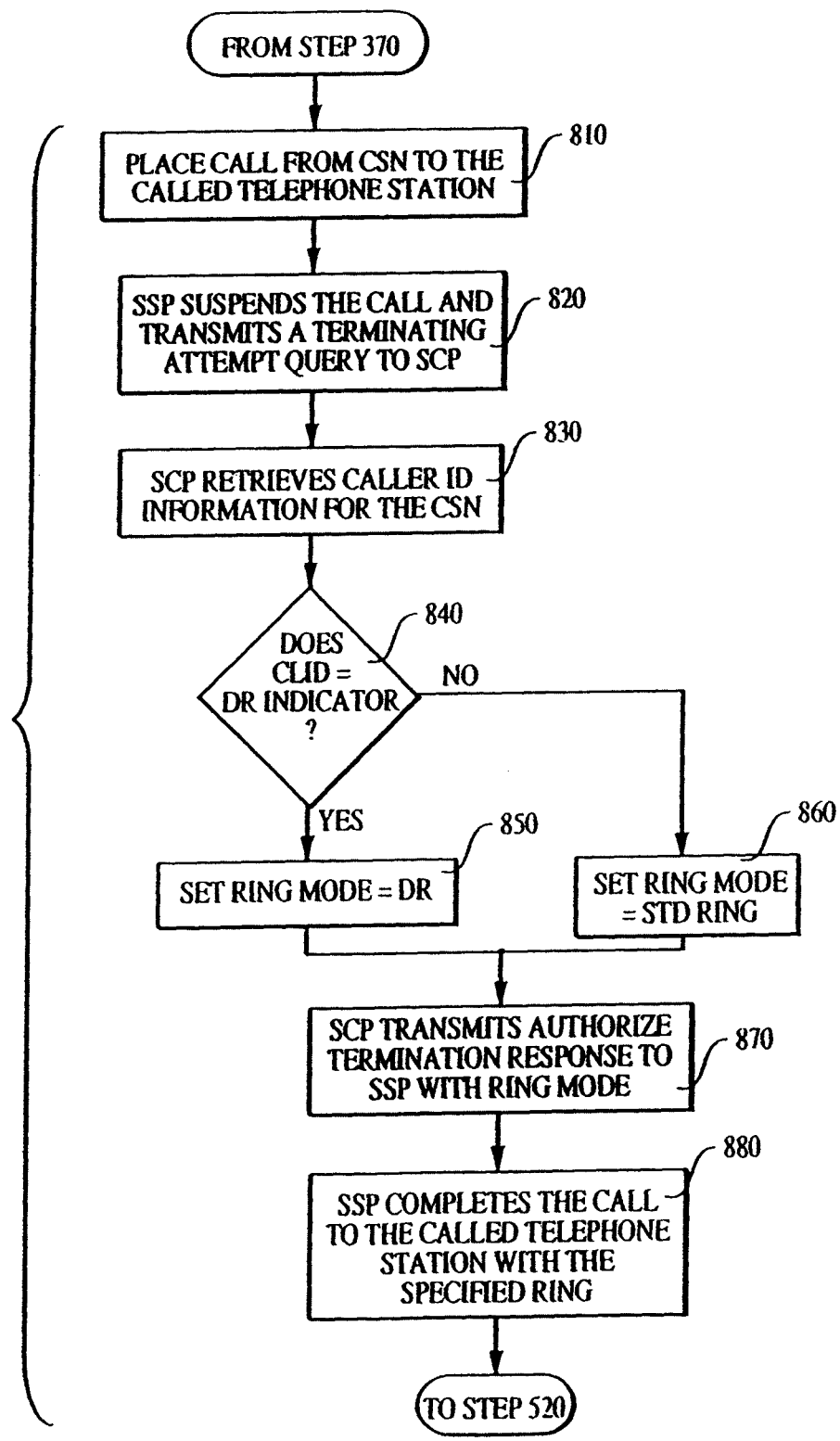
FIG. 9 is a more detailed flow chart of a portion the method of FIG. 4.

The step of transmitting the audible caller identification message from calling telephone station 262 to the called communication station 222 (step 380, FIG. 4) in one embodiment comprises the steps shown in FIG. 9. In this embodiment, the phone is rung with a distinctive ring or ringing cadence to indicate to the called party that the incoming call has been handled by present service to intercept a call for which standard Caller ID information could not be provided. This may be useful to assist the called party in deciding how to handle the incoming party.

At step 810, the SN/IP 250, embodied as a CSN in FIG. 9, places a call to the called telephone station 222 to complete the call in response to the PIN override. The call control for this call includes call control information, such as calling line identification (CLID) information for the SN/IP 250. In the illustrated example, the call control information includes a directory number (DN) for the SN/IP 250 and an indicator which indicates that, under the present circumstance, the call should be completed with a distinctive ring. The indicator may even specify the particular distinctive ring to use. In one embodiment, the indicator comprises predetermined caller identification information communicated as part of the call control information. In another embodiment, the indicator may be a service indicator as known to those skilled in the art. At step 820, the SSP 220 detects a terminating attempt trigger and suspends the call. The SSP 220 transmits a terminating attempt query message to the SCP 240. The terminating attempt query message includes the DN for the SN/IP 250 and the indicator.

At step 830, the SCP 240 processes the terminating attempt query message. The SCP 240 retrieves the DN for the SN/IP 250 and the indicator from the message and compares the indicator with a stored value. If, at step 840, the indicator matches the stored value, which may be termed a distinctive ring indicator, at step 850 the SCP 240 sets a ring mode for the call to distinctive ring (DR). If the indicator does not match the distinctive ring indicator, the SCP 240 sets the ring mode for the call to standard (STD) ring at step 860.

At step 870, the SCP transmits an authorize termination response message to the SSP 220. The authorize termination response message includes an indicator of the ring mode. At step 880 the SSP 220 completes the call to the called telephone station 222 with the specified ring. If the ring mode is set to distinctive ring, a distinctive ring is provided.

Figure 10:
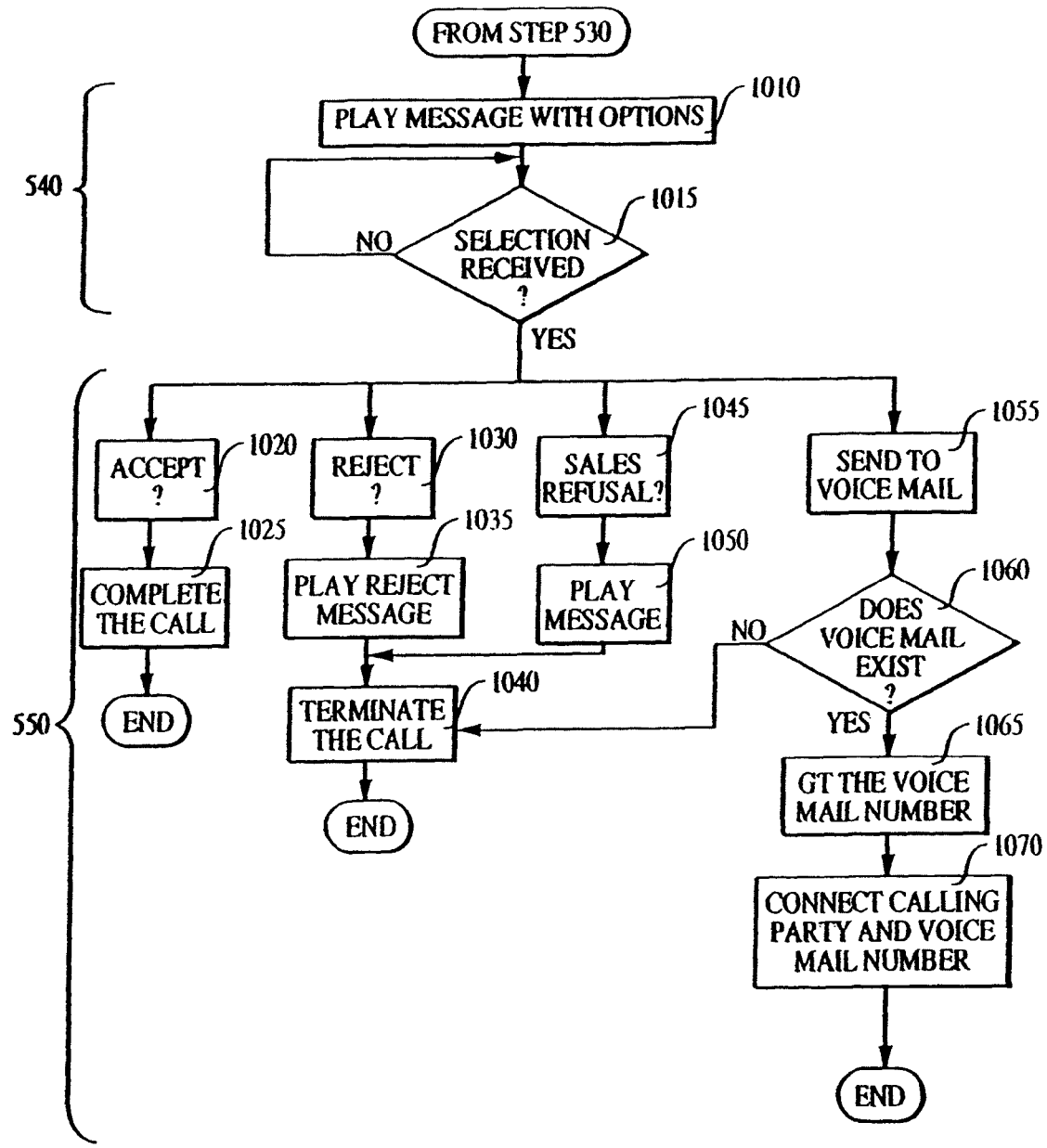
FIG. 10 is a more detailed flow chart of a portion the method of FIG. 4.

The steps of transmitting accept and reject options to the called telephone station and processing the call in response to input from the called party (steps 540, 550, FIG. 8) in one embodiment include the steps shown in FIG. 10. These steps permit the called party to handle the call in the most convenient manner. In particular, these steps permit the called party to send the call to a voice messaging system such as voice mail.

At step 1010, the audible caller identification information provided by the calling party is replayed to the called party and a further message providing call disposition options is played. This is typically performed by the SN/IP 250. At step 1015, the SN/IP 250 awaits a selection by the called party. The selection may be made, for example, by keypad entry at the called telephone station 222 which generates DTMF signals. Alternatively, the selection may be made by voice recognition of a spoken command by the called party. The SN/IP 250 detects the DTMF signals or other selection signals and converts them to numerical data for processing.

At step 1020, it is determined if the called party's selection entry corresponds to accepting the call. If so, at step 1025, the call between the calling telephone station 262 and the SN/IP 250 is joined with the call between the SN/IP 250 and the called telephone station 222. The method then ends. At step 1030, it is determined if the called party's selection entry corresponds to rejecting the call. If so, at step 1035, a reject message is played to the calling party, the call is cancelled at step 1040 and the method ends. At step 1045, it is determined if the called party's selection entry corresponds to sending a sales refusal message. If so, at step 1050, the message is played to the calling party and at step 1040 the call is cancelled. The method then ends.

At step 1055, it is determined if the called party's selection entry corresponds to sending the call to voice mail. If so, at step 1060, the SN/IP 250 determines if the called party has established a voice mail account. This is done at the SN/IP 250 by searching in a table of customers and associated voice mail numbers maintained in a database, such as SCP database 242, or at the SN/IP 250 or elsewhere in the network. If a voice mail number for the called party is located, at step 1065, the SN/IP 250 obtains the voice mail directory number for the account from the database. The SN/IP 250 may also play a message to the calling party, to inform the calling party that the call is being handled by a voice messaging system.

At step 1070, a call is placed from the SN/IP 250 to the directory number (DN) for the voice mail system. This call includes the DN for the voice mail account in the CalledParty field and the directory number for the called communication station as a redirecting party element. The SN/IP 250 then performs a join function to join the call between the calling communication station and the SN/IP 250 and the call between the SN/IP 250 and the DN of the voice mail system. In an AIN system, the SN/IP 250 performs a 2 B channel transfer to join the calls. The called voice mail system uses the DN for the called communication station in a table to locate voice mail information for the called party. The located voice mail information is then used, for example, to play a greeting message to the calling party. The method then ends.

The present embodiments provide an efficient and effective method and system for providing caller identification information to a customer when standard caller identification information is unavailable, incomplete, or blocked. Convenience features, such as personal identification number override, distinctive ringing and routing to voice mail, are provided. These features assist the called party to identify the nature of the call, even before answering the call, and process the call in the most convenient manner.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of the invention.

It is therefore intended that the foregoing detailed description be regarded as illustrative rather than limiting, and that it be understood that it is the following claims, including all equivalents, that are intended to define the spirit and scope of this invention.

We claim:

1. A computer readable storage medium storing computer readable program code, the code causing a computer to execute a process comprising:

determining whether standard caller identification information for a call from a calling party at a calling communication station can be provided to a called communication station, wherein if the standard caller identification information is available, routing the call to the called communication station with the standard caller identification information;

transmitting a request for audible caller identification information to the calling communication station in response to a determination that the standard caller identification information cannot be provided to the called communication station;

in response to a personal identification number provided by the called party and received at the computer from the calling party, connecting the call between the calling communication station and the called communication station;

transmitting the audible caller identification information to the called communication station; and canceling the call in response to input from the called communication station.

2. The computer readable storage medium as in claim 1 wherein connecting the call comprises:

while transmitting the request for audible caller identification information, detecting input data from the calling communication station;

if input data is detected, comparing the input data with a preset identification number; and if the input data matches the preset identification number, connecting the call.

3. The computer readable storage medium as in claim 2 wherein connecting the call further comprises:

detecting dual tone, multiple frequency signals produced by the calling communication station; and converting the dual tone, multiple frequency signals to numeric data.

4. The computer readable storage medium as in claim 1 wherein connecting the call further comprises:

ringing the called communication station; and when the called communication station is answered, immediately connecting the call.

5. The computer readable storage medium as in claim 1 wherein connecting the call further comprises:

ringing the called communication station with a distinctive ring; and when the called communication station is answered, immediately connecting the call.

6. The computer readable storage medium as in claim 5 wherein connecting the call further comprises:

comparing an indicator with a distinctive ring indicator;

if the indicator matches the distinctive ring indicator, establishing a distinctive ring mode;

if the indicator does not match the distinctive ring indicator, establishing a standard ring mode; and communicating ring signals to the called communication station in accordance with established ring mode.

7. A method for providing enhanced call identification comprising:

determining whether standard caller identification information for a call from a calling party at a calling communication station can be provided to a called communication station, wherein if the standard caller identification information is available, routing the call to the called communication station with the standard caller identification information;

transmitting a request for audible caller identification information to the calling communication station in response to a determination that the standard caller identification information cannot be provided to the called communication station;

in response to a personal identification number provided by the called party and received at the computer from the calling party, connecting the call between the calling communication station and the called communication station;

transmitting the audible caller identification information to the called communication station; and canceling the call in response to input from the called communication station.

8. The method of claim 7 wherein connecting the call comprises:

while transmitting the request for audible caller identification information, detecting input data from the calling communication station;

if input data is detected, comparing the input data with a preset identification number; and if the input data matches the preset identification number, connecting the call.

9. The method of claim 8 wherein connecting the call further comprises:

detecting dual tone, multiple frequency signals produced by the calling communication station; and converting the dual tone, multiple frequency signals to numeric data.

10. The method of claim 7 wherein connecting the call further comprises:

ringing the called communication station; and when the called communication station is answered, immediately connecting the call.

11. The method of claim 7 wherein connecting the call further comprises:

ringing the called communication station with a distinctive ring; and when the called communication station is answered, immediately connecting the call.

12. The method of claim 11 wherein connecting the call further comprises:

comparing an indicator with a distinctive ring indicator;

if the indicator matches the distinctive ring indicator, establishing a distinctive ring mode;

if the indicator does not match the distinctive ring indicator, establishing a standard ring mode; and communicating ring signals to the called communication station in accordance with established ring mode.

* * * * *